(12) United States Patent
Knauf et al.

(10) Patent No.: US 12,535,802 B2
(45) Date of Patent: Jan. 27, 2026

(54) METHOD FOR AUTOMATED PASS SCHEDULE CALCULATION IN RADIAL FORGING

(71) Applicant: SMS group GmbH, Düsseldorf (DE)

(72) Inventors: Frederik Knauf, Nideggen-Abenden (DE); Martin Wolfgarten, Aachen (DE)

(73) Assignee: SMS group GmbH, Düsseldorf (DE)

( * ) Notice: Subject to any disclaimer, the term of this patent is extended or adjusted under 35 U.S.C. 154(b) by 277 days.

(21) Appl. No.: 18/233,429

(22) Filed: Aug. 14, 2023

(65) Prior Publication Data

US 2024/0051013 A1 Feb. 15, 2024

(30) Foreign Application Priority Data

Aug. 15, 2022 (DE) .................. 102022208461.6

(51) Int. Cl.
*G05B 19/418* (2006.01)
*B21J 7/14* (2006.01)
*B21J 9/20* (2006.01)

(52) U.S. Cl.
CPC .......... *G05B 19/41865* (2013.01); *B21J 7/14* (2013.01); *B21J 9/20* (2013.01); *G05B 19/4183* (2013.01)

(58) Field of Classification Search
CPC ......... B21J 7/14; B21J 9/20; G05B 19/41865; G05B 19/4183
See application file for complete search history.

(56) References Cited

FOREIGN PATENT DOCUMENTS

| CN | 109622849 A | * | 4/2019 | ............... B21J 7/16 |
| DE | 3934236 A1 | * | 4/1990 | ............... B21J 1/04 |
| DE | 102005014221 A1 | | 10/2006 | |
| KR | 20030053710 A | * | 7/2003 | ............... B21J 5/02 |

OTHER PUBLICATIONS

Translation of KR-20030053710-A.*
Translation of DE-3934236-A1.*
Translation of CN-109622849.*
Knauf et al., co-pending U.S. Appl. No. 18/233,437, filed Aug. 14, 2023.
Knauf et al., co-pending U.S. Appl. No. 18/233,445, filed Aug. 14, 2023.
SMS group, SMX Radial forging machines. All-round pioneers. Published on Jan. 11, 2021—Printed in Germany.

* cited by examiner

*Primary Examiner* — Bobby Yeonjin Kim
(74) *Attorney, Agent, or Firm* — Smartpat PLC

(57) ABSTRACT

Radial forging of long products made of metal workpieces in a radial forging machine uses at least four forging tools arranged around the circumference of the workpiece, which are set up and adapted to simultaneously carry out the forging operation. An automatic pass schedule calculation includes entering start parameters for the radial forging process into a pass schedule calculation program and defining target parameters for the radial forging process. The pass schedule calculation program calculates a pass schedule or a forging sequence based on these start and target parameters. The pass schedule calculation program determines a temperature variation and the temperature distribution over the cross section of the long product and takes into account the change in shape during radial forging.

12 Claims, 5 Drawing Sheets

METHOD FOR AUTOMATED PASS SCHEDULE CALCULATION IN RADIAL FORGING

CROSS-REFERENCE TO RELATED APPLICATION

This application claims the benefit of German Patent Application DE 102022208461.6, filed on Aug. 15, 2022, the contents of which is incorporated by reference in its entirety.

TECHNICAL FIELD

The invention relates to a method for automated pass schedule calculation in the radial forging of long products made of metal workpieces, in particular steel, in a radial forging machine with at least 4 forging tools arranged around the circumference of the workpiece, which are set up and adapted to simultaneously carry out the forging operation over at least a partial length of the workpiece and/or long product.

BACKGROUND

Automated pass schedule calculation for open die forging presses and radial forging machines is generally known. Currently available software that calculates the geometric parameters, such as the diameter and length of the workpiece to be formed, as well as an average temperature of the workpiece throughout the forging process, is commercially available under the brand names ForgeBase® and COM-FORGE®, for example. This software enables the plant operator to enter an initial geometry and an end geometry in an input screen. Based thereon, the pass schedule is calculated by the software according to defined parameters. In other words, the software calculates how many forging passes it will take to reach the final geometry and what cross-section reduction is achieved per forging pass. The degree of stretching then results from the individual deformations. In addition, the temperature and required press force are estimated after a forge pass. However, the software is only able to calculate simple geometries such as forging bar steel.

SUMMARY

The present disclosure is based on a desire to further develop pass schedule calculation programs so that they can be used for complex geometries of long products such as offset shafts, for example railway axles. The disclosure further optimizes the forging results known from previous processes and to expand the parameters taken into account during forging.

These objects are achieved with a method as disclosed herein, a control and/or regulation unit of a radial forging machine as disclosed herein, and with a radial forging machine as disclosed herein.

The method is provided for automated pass schedule calculation in the radial forging of long products made of metal workpieces, in particular steel, in a radial forging machine with at least 4 forging tools arranged around the circumference of the workpiece, which are set up and adapted to simultaneously carry out the forging operation at least over a partial length of the workpiece and/or long product. For that purpose, start parameters for the radial forging process are entered into a pass schedule calculation program and target parameters for the radial forging process are defined. The pass schedule calculation program calculates a pass schedule or a forging sequence on the basis of these start and target parameters, whereby the pass schedule calculation program takes into account the temperature variation and the temperature distribution over the cross section of the long product as well as the change in shape during radial forging.

By calculating the temperature distribution and the deformation distribution over the component cross section the forging result overall is optimized. The described solution is basically possible using a combination of pass schedule calculation software and the finite element method, with the pass schedule calculation software determining a pass schedule, which is then mapped using the finite element method. As a result of the finite element method, the temperature distribution and deformation distribution over the cross section of the product to be formed can be detected. However, since the calculation of the temperature distribution and deformation distribution using the finite element method is time consuming, expensive and requires technologically trained personnel to use the FEM and evaluate the results, the calculation of the temperature distribution of the deformation distribution over the component cross-section is preferably carried out using the pass schedule calculation program. With such a calculation, a detailed statement about the quality of the forging depending on the calculated pass schedule can be made in a very simple and fast way prior to forging, which also results in the possibility of forming more complex geometries than simple steel bars. This capability specifically facilitates the secure and dependable forging of stepped shafts, such as railway axles.

Particularly in the case of geometries that deviate from bar steel, the material flow during forging, especially in the area of shoulders to be forged in a stepped shaft, is of particular importance for the local deformation to be introduced, in particular cross-section reduction, and thus temperature distribution and deformation distribution over the component cross-section. The method takes these parameters into account when calculating the pass schedule and preferably offers a forging result which is optimized for the respectively desired end geometry, and which can particularly preferably be achieved automatically and reproducibly.

The pass schedule is always calculated taking into account several influencing parameters such as the tool geometry, the maximum possible pressing force, the feed of the workpiece, the workpiece properties such as the flow curve of the material, etc. When calculating the pass schedule, all these parameters are taken into account in such a way that all limits such as the maximum pressing force are observed. Furthermore, the process of calculating the pass schedule is directed towards reducing material waste or scrap, which includes material that cannot be utilized for the final railway axle. For example, the ends that are correspondingly cut to length and cut off by means of a cutting device constitute waste in the case of a railway axle.

With shafts that are stepped on the inside—a dumbbell shape in which two outer thicker shoulders merge into a thinner middle part—the main challenge is that the tolerances between the two shoulders, i.e., the area that is stepped on the inside, are maintained as precisely as possible. The calculation takes into account, among other things, the proportionate material flow in the area of the tool contact surface in the positive and negative longitudinal direction. It should be noted in particular that the tool contact surface is characterized on the one hand by an area running parallel to the longitudinal direction of the workpiece and on the other hand by an inclined area, thus at an angle to the longitudinal direction of the workpiece. Compared to conventional radial forging, these forging operations result in a calculation that has to take into account significantly more influencing factors than is the case with radial forging of bar steel and similarly simple geometries.

Finally, in a preferred embodiment of the invention, when calculating the pass schedule, it is always taken into account that heat generated by forming work leads to heating of the workpiece, which must be taken into account with different materials, especially if threshold values for microstructural deformations or the like may be exceeded. The process sequence should therefore preferably be adapted to different materials.

In a preferred embodiment of the method, the pass schedule calculation program takes into account an optimized deformation distribution, particularly preferably within a previously specified temperature range. This provides a method that takes into account the locally different deformation distribution and the forming work associated with it, particularly in the case of radial forging of complex workpiece geometries to form long products, especially in the case of stepped shafts. Ideally, a long product is achieved that is forged over its entire length and cross section and at the same time does not have any area that has exceeded predetermined and material-dependent threshold values for temperature due to increased forming work. A long product is thus obtained, even with a complex geometry, which has a microstructure that is optimized over its length and cross section and, associated therewith, has optimized workpiece properties.

In this context, it is particularly preferred if the pass schedule calculation program takes into account the optimized deformation distribution and the temperature variation and temperature distribution after each pass. This provides a method that also takes into account intermediate steps in the forming of the workpiece into a long product and ensures that at no point in time during the radial forging process predetermined threshold values with regard to the system and method parameters are exceeded.

In a further embodiment of the invention, it is preferred if the starting parameters, which are entered into a pass schedule calculation program, include the starting geometry of the workpiece, its dimensions, its starting temperature, in particular the furnace temperature at which the workpiece was removed before the start of the radial forging process, and the material of the workpiece.

In addition, it is preferred if the target parameters that are specified for the radial forging process and entered into the pass schedule calculation program include the target geometry of the long product, the final dimensions of which include a homogeneous change in shape. The deformation distribution over the cross section of the long product and/or the temperature distribution over the cross section of the long product are the result of a method carried out with these target parameters. In this way, a method is made available which, with regard to the radial forging process, knows all the parameters required for optimal use of the pass schedule calculation program and takes them into account when calculating the pass schedule.

In this context, it is particularly preferred if an optimized deformation distribution, in particular over the individual steps of the forging process, is calculated by the pass schedule calculation program based on the target parameters of the temperature variation and temperature distribution, or that the temperature variation and temperature distribution, in particular over the individual steps of the forging process, are calculated based on the target parameter of an optimized deformation distribution. The method thus uses either the temperature variation and temperature distribution to optimize the deformation distribution, or the deformation distribution to optimize the temperature variation and temperature distribution, in particular over the individual steps of the forging process, and thus optimizes the pass schedule calculation program and finally the forging result itself.

It is also particularly preferred if an optimized microstructure or an optimized microstructure distribution is calculated by the pass schedule calculation program based on the target parameters of temperature variation and temperature distribution. As an alternative to this, in an equally preferred embodiment, the temperature variation and temperature distribution can be calculated using the microstructure as target parameters. In any case, a long product is obtained by radial forging, which preferably has a predetermined microstructure or a predetermined microstructure distribution in each component cross section.

In this context, it is also preferred if the pass schedule calculation program takes into account the heat of forming introduced into the workpiece by the forming work during radial forging. The reduction in cross section introduces significant energy into the workpiece and this energy is reflected not only in the resulting change in shape, but also in a clearly measurable increase in the temperature of the workpiece. This increase in the workpiece temperature is often significantly different locally in the case of different forming work that affects the workpiece and thus also has a locally significant influence on the existing or developing microstructure. Taking into account the forming heat introduced into the workpiece thus supports the method in achieving an optimal radial forging result.

In addition, it is particularly preferred if the method employs an online connection to a press control unit and can output optimized control commands during the radial forging process on the basis of measured values and/or calculated values. A control of the method designed in this way uses either suitable measurement results, in particular measured surface temperatures, or where measurements cannot be taken or would be difficult to take, calculated values for regular and ideally permanent online control of the radial forging process. This supports the goal of an optimized method for automated pass schedule calculation in the radial forging of long products made of metal workpieces in a particularly advantageous manner and with easily manageable means.

According to a further aspect, a control and/or regulation unit of a radial forging machine is provided, the control or regulation unit containing a pass schedule calculation program for executing the method according to the first aspect or at least cooperating with it.

According to a third aspect, a radial forging machine for the radial forging of long products made of metal workpieces, in particular made of steel, is provided with at least 4 forging tools arranged around the circumference of the workpiece, which are set up and adapted to synchronously carry out the forging operation at least over a partial length of the workpiece and/or long product, wherein the radial forging machine according to the third aspect is connected to a control and/or regulation unit according to the second aspect or at least cooperates with it. In this way, a radial forging machine is made available which is able to provide the plant operator with all the technical effects associated with the method according to the invention in accordance with the first aspect in a reliable and reproducible manner.

As already described above, such a radial forging machine is particularly preferably adapted and designed to carry out the radial forging of offset shafts such as railway axles.

The invention is explained in more detail below with reference to 5 figures, which show a sequence of possible forming steps for obtaining a stepped shaft from a cylindrical starting material.

DETAILED DESCRIPTION

An example of how an end product in the form of a railway axle 1 is radially forged from a continuously cast cylindrical starting material 2 in a plurality of pass sequences is shown below.

Figure 1:
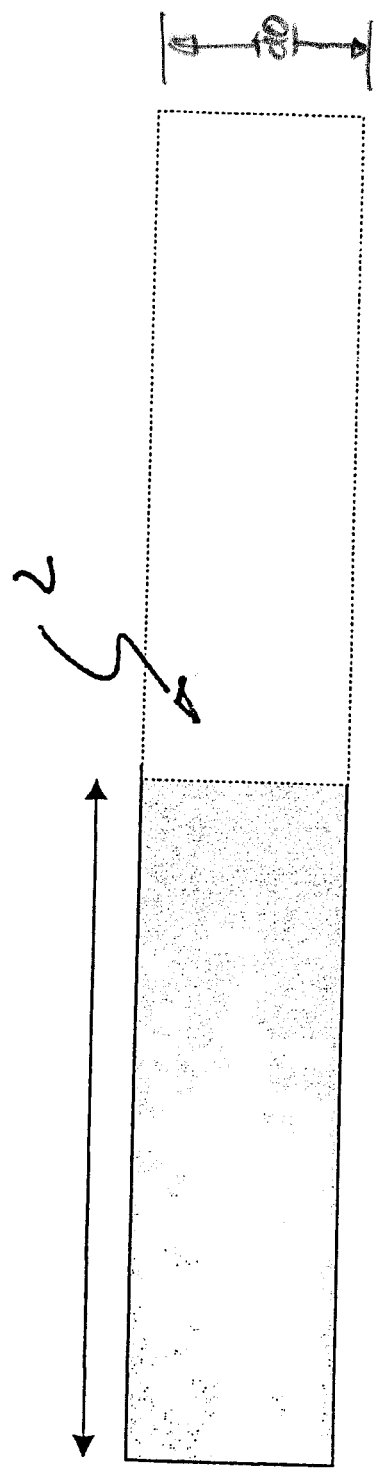
FIG. 1 shows a cross section through a starting material for carrying out the method.

FIG. 1 shows a starting material for a method according to the disclosure, here a cylindrical continuously cast billet made of carbon steel with a diameter d0.

Figure 2:
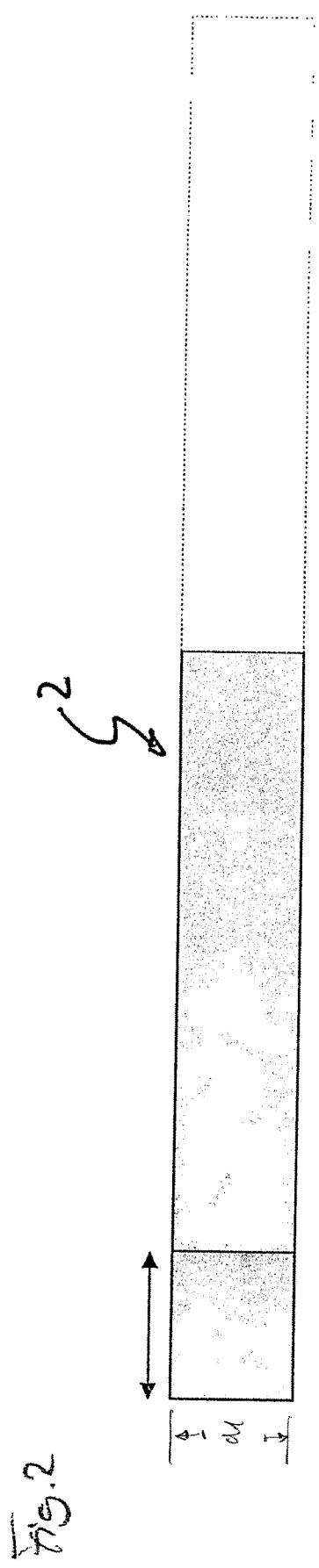
FIG. 2 shows an intermediate product after a first pass.

FIG. 2 shows the workpiece after a first pass, i.e., a sequence of forming operations of the radial forging machine (not shown) on the starting material 2 from FIG. 1, with the billet 2 being reduced over its entire length to a diameter d1. Thus, the length of the billet 2 has increased accordingly.

Figure 3:
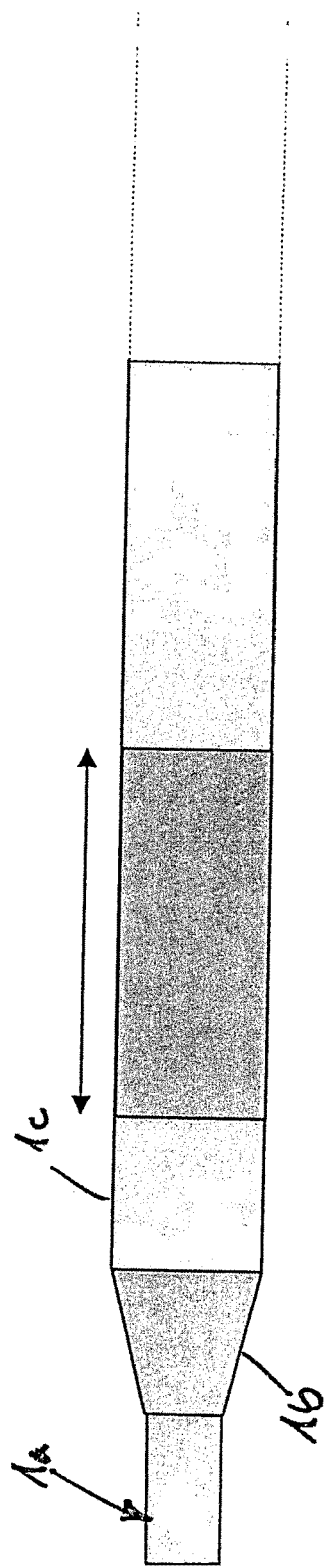
FIG. 3 shows an intermediate product after a second pass.
Figure 5:
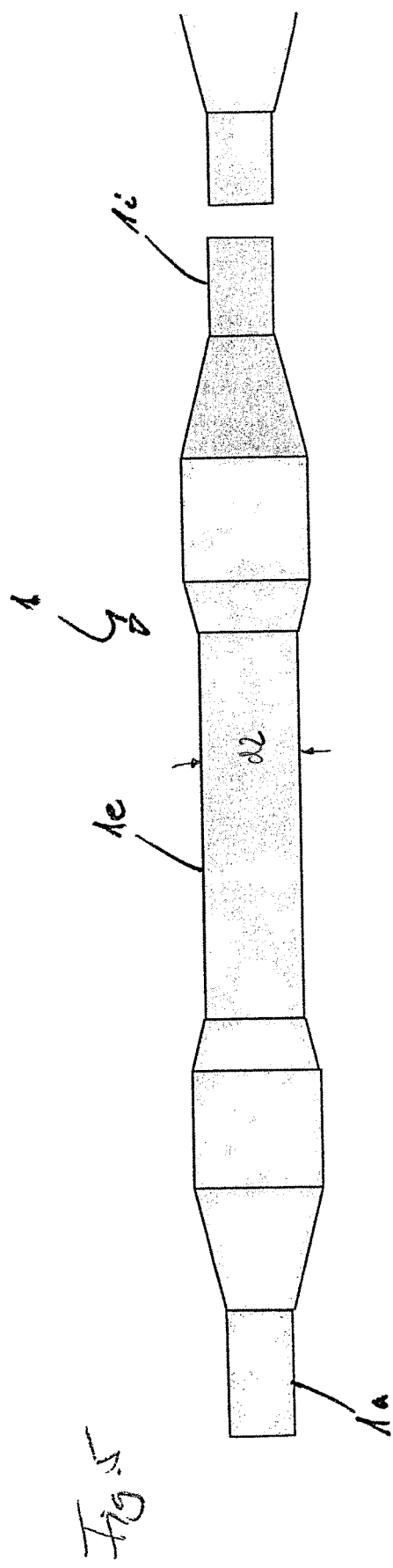
FIG. 5 shows the end product after a fifth pass.

FIG. 3 shows a further intermediate stage from the billet 2 from FIG. 1 to a completely formed railway axle 1, as can be seen in FIG. 5. Viewed from left to right, the drawn out billet 2 has already been formed to its final geometry in a first journal area 1a, as well as in the transition area 1b and the cylindrical area 1c.

Figure 4:
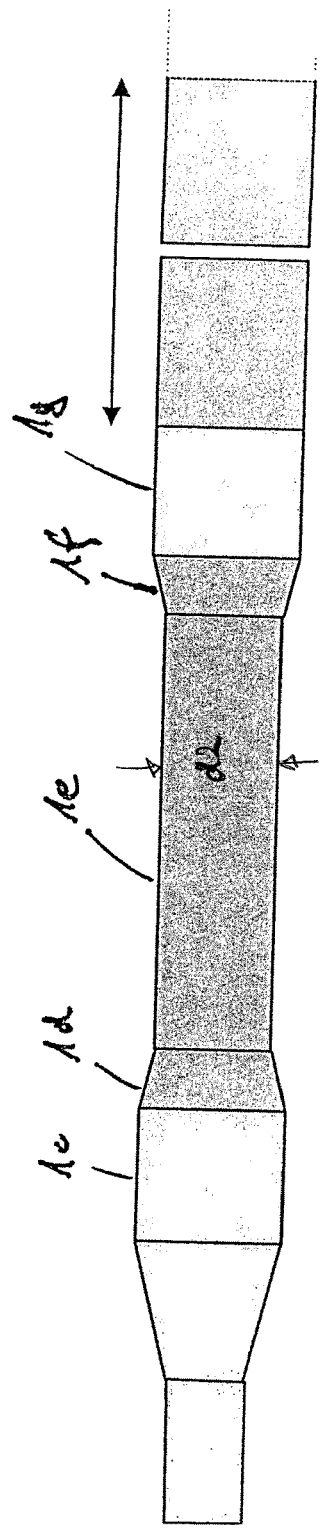
FIG. 4 shows an intermediate product after a fourth pass.

FIG. 4 shows a further intermediate step of the radial forging from the billet 2 to the finished forged part 1, with the forming of the central railway axis section 1e to its final diameter d2, left and right adjoining areas 1d and 1f, which form the transition from the central area 1e to the areas 1c and 1g.

Finally, FIG. 5 shows a railway axle 1 radially forged using a method according to the invention with its mirror-symmetrical final geometry, in which the end regions 1a and 1i have a diameter d3 and the central region 1e has the diameter d2. The entire forming process from the starting material according to FIG. 1 to the final forging according to FIG. 5 was carried out using the method for automatic pass schedule calculation and has produced a forging 1 which provides an optimized microstructure and an optimized deformation distribution for the desired application.

What is claimed is:

1. A method for radial forging a long product from a metal workpiece, utilizing automatic pass schedule calculation, the method comprising:
    entering start parameters for the radial forging process into a pass schedule calculation program;
    defining target parameters for the radial forging process; and
    calculating, by the pass schedule calculation program, a pass schedule or a forging sequence based on the start parameters and the target parameters,
        wherein the pass schedule calculation program takes into account a temperature variation, and a temperature distribution over a cross section of the long product, and a change in shape during the radial forging; and
    controlling a radial forging machine with at least four forging tools arranged around a circumference of the metal workpiece, the at least four forging tools being configured to simultaneously carry out the radial forging over at least a partial length of the metal workpiece based on the calculated pass schedule or forging sequence.

2. The method according to claim 1, wherein the pass schedule calculation program takes into account a deformation distribution within a predetermined temperature range in the metal workpiece.

3. The method according to claim 2, wherein the pass schedule calculation program takes into account the deformation distribution, the temperature variation, and the temperature distribution after each pass.

4. The method according to claim 1, wherein the starting parameters include at least a starting geometry of the metal workpiece, its dimensions, starting temperature, and material.

5. The method according to claim 1, wherein the target parameters include at least a target geometry of the long product, its final dimensions and deformation distribution over the cross section of the long product, and/or the temperature distribution over the cross section of the long product.

6. The method according to claim 5,
    wherein based on the target parameters of temperature variation and temperature distribution, a deformation distribution over individual steps of the radial forging process is calculated by the pass schedule calculation program, or
    wherein based on the target parameter of a deformation distribution, the temperature variation and temperature distribution over the individual steps of the radial forging process is calculated.

7. The method according to claim 1, wherein a microstructure or a microstructure distribution is calculated by the pass schedule calculation program based on the target parameters of temperature variation and temperature distribution.

8. The method according to claim 1, wherein the temperature variation and temperature distribution are calculated using a microstructure as target parameter.

9. The method according to claim 1, wherein the pass schedule calculation program takes into account heat of deformation introduced into the metal workpiece by deformation work during radial forging.

10. A control and/or regulation unit of a radial forging machine, with a pass schedule calculation program for carrying out the method according to claim 1.

11. A radial forging machine for the radial forging of long products made of metal workpieces, comprising:
    at least four forging tools arranged around a circumference of a workpiece, the at least four forging tools being configured to simultaneously carry out a forging operation over at least a partial length of the workpiece; and
    a control and/or regulation unit,
    wherein the control and/or regulation unit is configured to perform the following steps:
        entering start parameters for the radial forging into a pass schedule calculation program;
        defining target parameters for the radial forging; and calculating a pass schedule or a forging sequence based on the start parameters and target parameters by the pass schedule calculation program,
 wherein the pass schedule calculation program takes into account a temperature variation and a temperature distribution over a cross section of the long product and a change in shape during the radial forging; and
issuing control commands to the forging tools during the radial forging based on the calculated pass schedule or forging sequence.

12. The radial forging machine according to claim 11, adapted and designed for the radial forging of stepped shafts.

* * * * *